(12) United States Patent
Yen et al.

(10) Patent No.: US 7,214,319 B2
(45) Date of Patent: May 8, 2007

(54) METHOD OF SEPARATING PROTEIN FROM ANIMAL MILK

(75) Inventors: Chon Ho Yen, Miaoli (TW); Mei Ling Lin, Miaoli (TW)

(73) Assignee: Animal Technology Institute Taiwan, Miaoli (TW)

( * ) Notice: Subject to any disclaimer, the term of this patent is extended or adjusted under 35 U.S.C. 154(b) by 306 days.

(21) Appl. No.: 10/715,559

(22) Filed: Nov. 19, 2003

(65) Prior Publication Data
US 2004/0251202 A1  Dec. 16, 2004

(30) Foreign Application Priority Data
Jun. 10, 2003  (TW) .............................. 92115661 A

(51) Int. Cl.
*B01D 61/14* (2006.01)
*A23C 9/12* (2006.01)
*A23J 1/20* (2006.01)
*B01D 61/00* (2006.01)

(52) U.S. Cl. .................. 210/651; 210/641; 210/500.41; 210/509; 210/635; 210/650; 210/645; 210/656; 210/724; 426/36; 426/41; 530/412

(58) Field of Classification Search .................. None
See application file for complete search history.

(56) References Cited

U.S. PATENT DOCUMENTS

| 4,798,847 | A | * | 1/1989 | Roesink et al. ............... 521/50 |
| 4,876,100 | A | * | 10/1989 | Holm et al. ................. 426/491 |
| 4,897,277 | A | * | 1/1990 | Dieu et al. .................. 426/491 |
| 5,756,687 | A | * | 5/1998 | Denman et al. ............ 530/412 |
| 6,051,268 | A | * | 4/2000 | Mahmoud et al. .......... 426/580 |

* cited by examiner

*Primary Examiner*—Krishnan S. Menon
(74) *Attorney, Agent, or Firm*—Bacon & Thomas, PLLC

(57) ABSTRACT

The present invention refers to a method of separating casein from animal milk, especially, after defatting the animal milk as the pretreatment, the processing of the defatted milk aforesaid through a ceramic filtration membrane to remove the casein in the milk. The pretreatment process of separating the casein from the milk is then complemented by other processes of purification, so as to obtain the target protein of higher purity.

6 Claims, 4 Drawing Sheets

12% SDS-PAGE $W_0$ : whole milk
$W_f$ : the milk not having been processed through ultrafiltration membrane
$C_0$ : the protein composition of the milk having been processed through ultrafiltration membrane $C_0$  $W_f$  $W_0$

← 220K

← 97K

← 66K ← human coagulation factor IX

← 45K

← 30K
← 20.1K $W_0$ : whole milk
$W_f$ : the milk not having been processed through ultrafiltration membrane
$C_0$ : the protein composition of the milk having been processed through ultrafiltration membrane

METHOD OF SEPARATING PROTEIN FROM ANIMAL MILK

BACKGROUND OF THE INVENTION (A) Technical Field of the Invention

The present invention provides a method of separating casein from animal milk by means of ceramic filtering membrane, and its subsequent applications.

(B) Description of the Prior Art

Human protein medicines such as Insulin, Erythropoietin (EPO), and Human Growth Hormone (HGH), etc. have been put to use in clinical practice for years with fairly good medicinal effects; however, because in the past the sources of such medicines could only be acquired from natural blood, tissues, or organs, the production volume was very low and the prices were high, making it difficult for the ordinary people to afford them. In recent years, with the advancement of biological technologies, human beings have been able to mass-produce these types of medicines by using the technology of recombinant DNA, and, as the result, the production costs of human protein medicines have been lowered significantly.

Among various systems of producing recombinant protein medicines, transgenic animals, because of its being able to produce within their bodies a large amount of desired target protein, are found to be of more potentiality in being commercialized than yeast or zooblast. By transferring the foreign genes inside the bodies of mammals, a large amount of recombinant target protein can be purified from the milk they excrete; however, because milk is a sophisticated bio-colloid, the complexity of its composition is equivalent to that of plasma, hence causing difficulty in the process of purification.

Generally speaking, the composition of the endogenous protein in the milk of transgenic animals does not differ from that of non transgenic animals simply because it contains recombinant target protein. Therefore, the amount of recombinant target protein present in the milk of transgenic animals will affect the amount of difficulty involved in the purification; theoretically, the more the present amount of foreign gene, the better. But for some complicated structured proteins, due to the concerns over their modifications, the amount present is usually not set very high.

The proteins in the milk are mainly composed of casein, and the content of casein is over 50% of the total amount of protein; therefore, casein often becomes the source of impurity in the purification process of the protein. Casein exists in milk in the form of micelles. Take the milk of pigs as an example. Casein is bonded with colloidal calcium phosphate to form in the milk suspending particles of 133 nm in diameter on the average. Furthermore, plasmin is also a component packed full of in milk which is able to hydrolyze the peptide bonds between Lys-X and Arg-X, while the optimal parameter for its activity in hydrolysis is pH value 7.5, at 37° C. Hence, after the milk sample is collected, the key concern will be on how to avoid the effect by the plasmin. Since plasmin exists in milk by means of bonding with the micelles of casein, the separation of recombinant protein from milk should first consider the removing the casein micelles; however, it is rather a difficult and an annoying process in the situations of practical operation.

The existing methods of removing the casein micelles include the first method by adjusting the pH of the milk to 4.6 or below to allow the milk separated into precipitate of acid based milk curds and whey that contains soluble recombinant protein, but the drawback of this method is that the change of pH value often destroy the structure of protein, depriving of its activity; besides, if the recombinant protein itself is an acidic protein, it will precipitate at such pH value and not able to be separated; furthermore, the condition of acidity will cause the residual base of sialic acid to be removed from carbohydrate protein, resulting in the change of composition to the protein. The second method uses PEG to enable the casein micelles to precipitate, but the prerequisite is that the recombinant target protein cannot be precipitated. Apart from the restrictions aforesaid for these two methods, it takes the centrifugal force of a super high performance centrifuge to make normal casein micelles precipitate when no treatment is applied; such a requirement of high performance centrifugal force for separating the precipitates and the clear fluid on top actually causes lots of inconvenience in operation high volume. The third method is using EDTA or citrate to dissolve the casein micelles, and then process through ultrafiltration. Ultrafiltration is a process commonly used in the manufacturing of organic medicinal preparations (such as medical protein, serum, antibody, etc.), the main function of which is to remove the microorganism or virus in the biologicals, or to remove small molecules of salts in solutions. As milk is a sophisticated type of bio-colloid, its micelles tend to block the filtering membrane during ultrafiltration, posing a technical bottleneck that definitely requires a solution.

DETAILED DESCRIPTION OF THE INVENTION

Figure 1:
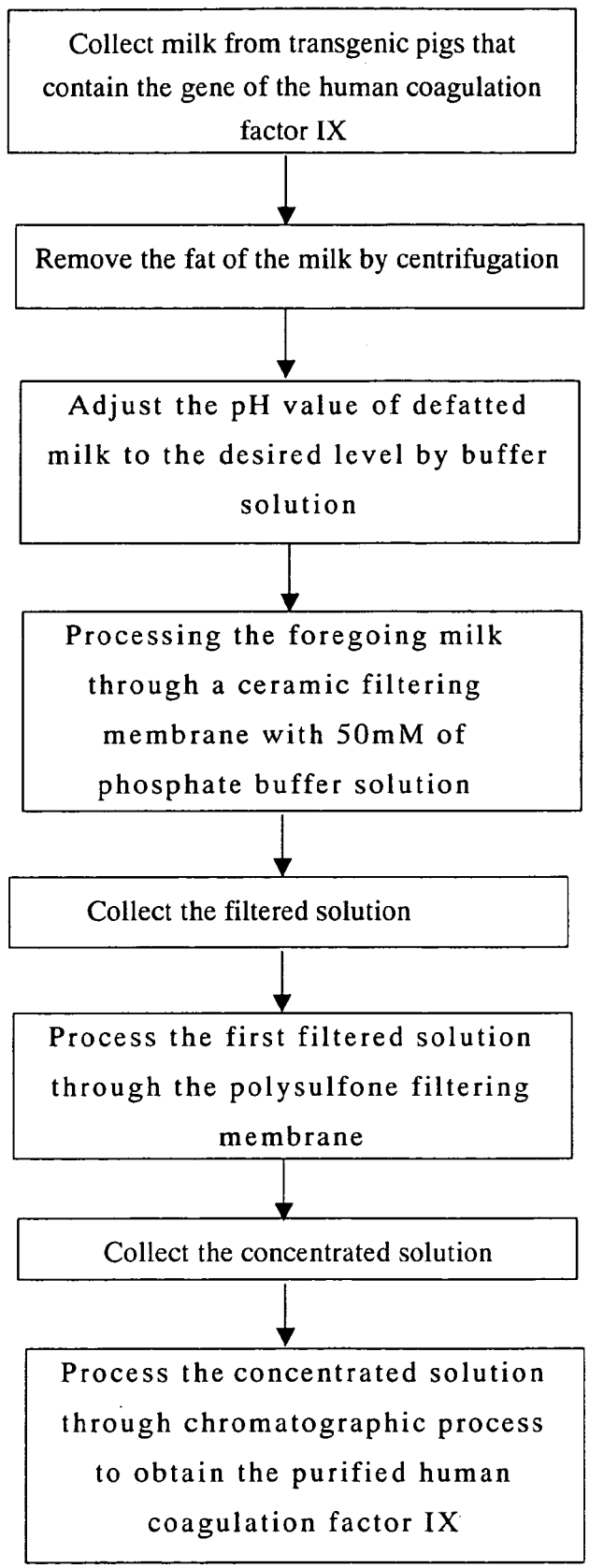
FIG. 1 illustrates the purification process of the human coagulation factor IX (hFIX) by applying the method of the present invention.

In view of the aforesaid difficulty of casein removal that often occurs during the purification of target protein from animal milk, the present invention is to provide a method that separates casein from animal milk, including using a non-electric-charged filtering membrane to filter animal milk under the flow pressure of 10–20 psi and at a certain pH value, so as to separate the casein from the milk, in which the aforesaid filtering membrane can be ceramic filtering membrane. The diameter of the holes of the aforesaid ceramic filtering membrane is preferably between 0.1 μm and 0.44 μm, while the optimal diameter is between 0.14 μm and 0.2 μm.

The milk in the aforesaid method can be whole milk, defatted milk or whey. The mode of the aforesaid filtration is diafiltration. The aforesaid certain level of pH value can vary depending on the physical properties or chemical properties of the target protein to be purified.

The aforesaid method allows further adding of a pretreatment process, depending on the need, to remove the fat in the milk, wherein the aforesaid pretreatment process including a centrifugal process.

The aforesaid animals can be non-transgenic animals or transgenic animals.

The present invention also provides a method of purifying a target substance from animal milk, using the aforesaid method to remove the casein form the milk so as to obtain target substance of higher purity, such as peptide or protein.

Another objective of the present invention is to provide a method that has the target substance purified from animal milk, including the following procedures: (a) using buffer solution to adjust the pH value of the animal milk to a certain level; (b) processing the animal milk of the certain pH value obtained from Step (a) through a first filtering membrane under a certain flow pressure, for the purpose of separating the casein from the milk while collecting the filtered solution; and (c) processing the aforesaid filtered solution through the second filtering membrane under a certain flow pressure and at a certain pH level, for the purpose of condensing the target substance while collecting the second concentrated solution.

The aforesaid target substance can be peptide or protein, while the aforesaid protein can be the human coagulation factor IX.

The aforesaid filtering membrane can be ceramic filtering membrane. The diameter of the holes of the aforesaid ceramic filtering membrane is preferably between 0.1 μm and 0.44 μm, while the optimal diameter is between 0.14 μm and 0.2 μm.

The aforesaid second filtering membrane is polysulfone filtering membrane; the optimal diameter of its holes is 30 kD.

The certain flow pressure in the aforesaid Step (b) and Step (c) is between 10 psi and 20 psi, while the filtration mode in the aforesaid Step (b) and Step (c) is diafiltration.

The optimum of the certain pH value in the aforesaid Step (a), Step (b) and Step (c) is preferably between 5.0 and 6.5.

The aforesaid method allows further adding of a chromatographic process after Step (c), depending on the needs, in order to purify the target substance. The aforesaid chromatographic process can be salt in, salt out, gel filtration, ion exchange chromatography, or affinity chromatography.

The aforesaid method also allows the adding of a pretreatment process before Step (a), depending on the needs, in order to remove the fat in the milk, wherein the aforesaid pretreatment process including a centrifugal process.

The aforesaid milk can be whole milk, defatted milk, or whey, the aforesaid animals being non-transgenic animals or transgenic animals.

Another objective of the present invention is to provide a method of purifying the human coagulation factor IX from animal milk, at least including the following procedures: (a) using buffer solution to adjust the pH value of the animal milk to a range between 5.0 and 6.5; (b) processing the animal milk of the certain pH value obtained from Step (a) through a ceramic filtering membrane under a flow pressure between 10 psi and 20 psi, for the purpose of separating the casein from the milk while collecting the filtered solution; and (c) processing the aforesaid filtered solution through polysulfone filtering membrane under a flow pressure between 10 psi and 20 psi and at a pH level between 5.0 and 6.0, for the purpose of condensing the human coagulation factor IX while collecting the second concentrated solution.

The aforesaid method allows the adding of a centrifugal process before Step (a), depending on the needs, to remove the fat in the milk; it also allows the adding of a chromatographic process after Step (c), depending on the needs, to purify the human coagulation factor IX.

DETAILED DESCRIPTION OF THE PREFERRED EMBODIMENTS

The technical characteristics and advantages of the present invention will be further discussed below by taking the purification of the human coagulation factor IX as an example of embodiments, but the technique of the present invention is not limited to the purification of this protein.

As illustrated in FIG. 1, the operation procedures for the purification of the human coagulation factor IX include defat, ultrafiltration & diafiltration, and chromatograph.

I. Defat

Collect 200 ml of milk from transgenic pigs that contain the gene of the human coagulation factor IX, while the milk contains the recombinant protein of the human coagulation factor IX presented in the milk glades. Place the milk under a centrifugal force of 3000×g at 4° C. for 20 minutes to remove the fat of the milk on the top, prior to proceeding with the next purification procedure or being stored in the refrigerator at −80° C. for later use.

II. Diafiltration & Condensation

Adjust the pH value of colloidal solution obtained to the desired level by using buffer solution, and then let it pass through a ceramic filtering membrane with a hole diameter of 0.14 μm for filtration. By the filtering mode of diafiltration under the flow pressure condition of an index between 10 psi and 20 psi, filter the defatted pig milk, and, in the meantime, dialyze it with 50 mM of phosphate (pH value is the same as aforesaid buffer) buffer solution, so as to remove the micelles of casein, protein of large molecules, and calcium from the pig milk, thus obtaining a clear slightly yellowish filtered solution.

Let the filtered solution pass through the polysulfone (PS) ultrafilter membrane with a hole diameter of 30 kD for filtration. Also by the filtering mode of diafiltration under the flow pressure condition of an index between 10 psi and 20 psi, filter the small molecules, and, in the meantime, dialyze it with 50 mM Tris-HCl (pH 7.4) buffer solution. After the dialysis is completed, proceed with the condensation to obtain a clear filtered solution.

III. Chromatograph

A. Ion-exchange Chromatography

Allow the filtered solution of the 50 mM Tris-HCl (pH 7.4) buffer that contains the human coagulation factor IX to run at a flow rate of 1 L/hr. through an anion chromatographic gel of STREAMLINE Q-XL column. Use the 50 mM Tris-HCl (pH 7.4) buffer that contain different concentration of NaCl, 0.1N, 0.2N, 0.3N, 0.4N, and 0.5N, successively as the elution buffer, to collect the fractions of protein of different salt concentrations. Through the analysis by 280 nm ultraviolet ray, it shows that the fractions of protein of different salt concentrations forms different patterns of protein distribution. Get samples from each of the protein fractions and conduct blood clotting and activity analysis, SDS-PAGE analysis, and Western Blotting analysis; where the blood clotting and activity analyzer is used for analyzing the fraction with the distribution of active human coagulation factor IX. Use the 50 mM Tris-HCl (pH 7.4) buffer as a desalt solution to remove the NaCl in the solution that contains active human coagulation factor IX collected from the fraction, then for condensation, preparing it for the next procedure of affinity chromatography.

B. Affinity Chromatography

Allow the 50 mM Tris-HCl (pH 7.4) buffer that contains active human coagulation factor IX as obtained from the aforesaid Step A to run at a flow rate of 15 ml/min. through Heparin Sepharose 6 FF column, use the same parameters as for the aforesaid STREAMLINE Q-XL column to elute and collect the protein obtained under different NaCl concentrations.

Use the same blood clotting and activity analyzer for analyzing the fraction with the distribution of active human coagulation factor IX.

The high purity solution of human coagulation factor IX obtained after desalt and diafiltration is then added, for one part, with preserving agent containing 10 mmole/L histidine, 0.26 mmole/L glycine, 1% sucrose, and 0.005% polysorbate-80, at neutral pH value, stored in separate columns with 1:1 volume ratio under −80° C., while, for the other part, the solution is not added with any preserving agent but stored under the temperature of −80° C., for qualitative and quantitative analysis later on.

The Results of the Experiment:

Experiment results from using membranes of different materials and hole diameters are as shown in Table 1:

TABLE 1

| Filtering Membrane Material | Method | Membrane Hole Diameter | Casein Micelles Filtered | Filtered Human coagulation factor IX |
|---|---|---|---|---|
| Polysulfone | Ultrafiltration | 30 KD | N/D | N/D |
|  |  | 100 KD | N/D | N/D |
|  |  | 300 KD | N/D | small amount |
|  |  | 500 KD | N/D | N/D |
| Ceramic | Ultrafiltration | 30 KD | N/D | N/D |
|  | Microfiltration | 0.14 μm | N/D | significant amount |
|  |  | 0.20 μm | N/D | significant amount |
|  |  | 0.45 μm | Casein micelles appear in filtered solution | significant amount |

Note:
Casein micelles are detected by the clarity of the solution and the volume of the band shown on SDS-PAGE; human coagulation factor IX are detected by Western Blotting.
"N/D" means that the aforesaid methods cannot detect any;
"small amount" means that the filtered amount is less than 5% of the total amount;
"significant amount" means that the filtered amount is larger than 5% of the total amount.

Figure 2:
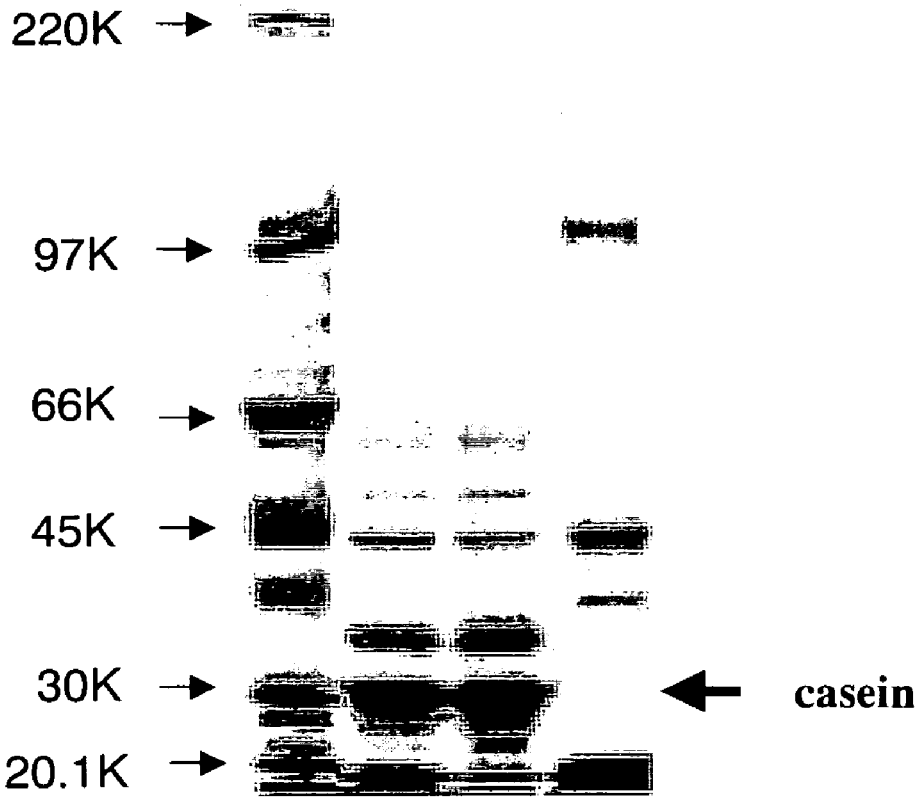
FIG. 2 illustrates the performance of separating casein by applying the method of the present invention.
Figure 3:
FIG. 3 illustrates large amount of the human coagulation factor IX still retained in the filtered solution after the separation of casein by applying the method of the present invention.

Allow the milk to run under pH value 5.5 through the first ceramic filtering membrane of a hole diameter of 0.14 μm. Three samples, crude whole milk with the same amount of protein, not having been processed through the ceramic filtering membrane, and having been processed through the ceramic filtering membrane, will be analyzed their protein composition by electrophoresis. Separately perform SDS-PAGE analysis on each group to compare their protein composition. The results are as shown in FIG. 2, where $W_0$ represents the whole milk; $W_f$ represents the milk not having been processed through ultrafilter membrane, $C_0$ represents the protein composition of the milk having been processed through ultrafilter membrane. As shown in the drawing, there in the protein composition ($C_0$) having been processed through ceramic filtering membrane can be found that in the vicinity of molecular weight 30 KDa the amount of casein molecules significantly reduced down to almost none. When the protein on the SDS-PAGE are trans-blotted onto the PVDF membrane, use the antibody against human coagulation factor IX to perform calorimetric western blots, and the results are as shown in FIG. 3. Given the fact that most of the human coagulation factor IX are still in the filtered solution, it indicates that the present invention can adequately separate the casein in the milk while keeping the human coagulation factor IX.

Figure 4:
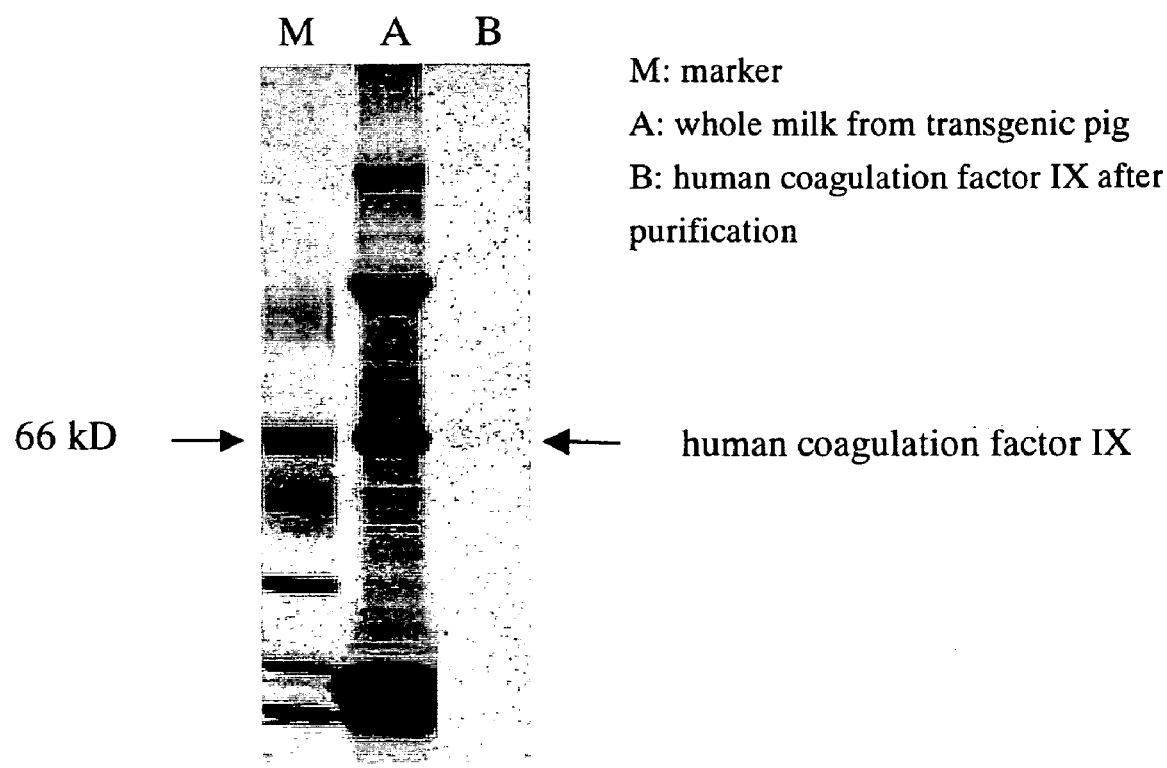
FIG. 4 illustrates the human coagulation factor IX obtained after purification.

After the filtered solution from the first filtering membrane (ceramic filtering membrane) runs through the second filtering membrane (polysulfone filtering membrane) for diafiltration while turning the buffer solution into 50 mM Tris-HCl (pH 7.4), this protein solution is then guided into a Sepharose Q column, while the column is washed with a solution of 50 mM Tris-HCl (pH 7.4) till no protein comes out. Then, elute out the portion containing the human coagulation factor IX by using the original NaCl-containing buffer solution, collect this portion and dilute with a solution of 50 mM Tris-HCl (pH 7.4), then fill into Heparin-Sepharose column, and use the original NaCl-containing buffer solution to elute out the purified human coagulation factor IX. The results are as shown in FIG. 4.

The Influence of pH Value on Recovery Ratio:

In addition, the results of comparison on the final recovery ratio of the human coagulation factor IX under different pH values by using 0.14 μm ceramic filtering membrane in conducting experiments are shown in Table 2.

TABLE 2

| Milk pH Value | Recovery ratio of the human coagulation factor IX (%) |
|---|---|
| pH 8.4 | 5 |
| pH 7.4 | 9 |
| pH 6.0 | 40 |
| pH 5.5 | 55 |
| pH 5.2 | 52 |

Note:
Recovery ratio is (Total Amount of the human coagulation factor IX after purification)/(Total amount of the human coagulation factor IX in the original defatted milk) × 100%

Discussions of the Results:

The content of casein accounts for over 50% of the total protein in milk. During the purification procedures of protein, the amount of target protein (the human coagulation factor IX in this invention), compared with that of the casein, is relatively small. As the result, the casein is very likely to become the source of impurity, and, hence, the separation of casein from the target protein becomes an indispensable job in the purification procedures.

The prior art of removing casein includes adjusting the pH value of the milk to 4.2 or below, or adding PEG before applying a centrifugal force of 12,000×g, 60 minutes, and so on. Although it can make the micelles of casein to form precipitates, the human coagulation factor IX also precipitate under this condition in the meantime, thus failing to separate the casein from the human coagulation factor IX. Besides, if the pH value of the milk is lowered to 5.5, conditioned with 48,000×g centrifugal force for 2 hours, the milk will be separated into two layers with a top layer relatively clearer, and a bottom layer containing the micelles of casein. The volume ratio of these two layers is just about 1:1, but there is still around 70% of the human coagulation factor IX existing in the bottom layer, probably because part of the human coagulation factor IX are bonded with the micelles of casein. Therefore, this method can only separate the casein from part of the human coagulation factor IX; meanwhile, it requires high performance of centrifugal force, thus making it inappropriate to put this method in use for the operation of mass production.

The experiment of the present invention uses ceramic filtering membrane of diameters 0.14 μm and 0.20 μm to separate casein micelles from the human coagulation factor IX, and, as the results, it is found that using ceramic membranes of these two diameters can obtain large amount of the human coagulation factor IX, indicating that the human coagulation factor IX can easily pass through the ceramic membranes of these two diameters. Furthermore, as there is no casein micelle found in the filtered solution, this indicates that casein micelles do not pass through the ceramic filtering membrane.

The aforesaid example of embodiment is intended for the purpose of discussing the contents of the present invention in details, and not to be used for limiting the particular forms as proclaimed by the present invention. The scope of the present invention shall be based on the definitions in the claims as appended to this article, and shall include all the modifications and equivalent variations that are not separated from the spirit and scope of the present invention.

What is claimed is:

1. A method of purifying the human coagulation factor IX from animal milk, at least including the following procedures:
   (a) stabilizing the human coagulation factor IX in transgenic animal milk while precipitating casein consisting essentially of adjusting the pH to a range between 5.0 and 6.5 using a buffer solution;
   (b) processing the animal milk of the certain pH value obtained from Step (a) through a ceramic filtering membrane under a flow pressure between 10 psi and 20 psi, for the purpose of separating the casein from the milk while collecting the filtered solution
   (c) processing the aforesaid filtered solution through polysulfone filtering membrane under a flow pressure between 10 psi and 20 psi and at a pH value of 5.0 and 6.5, for the purpose of concentrating the human coagulation factor IX while collecting the second concentrated solution and;
   (d) processing the aforesaid concentrated solution by chromatographic process to purify the human coagulation factor IX.

2. The method as claimed in claim 1, wherein the diameter of the holes of the aforesaid filtering membrane is between 0.1 μm and 0.44 μm.

3. The method as claimed in claim 1, wherein the diameter of the holes of the aforesaid filtering membrane is between 0.14 μm and 0.2 μm.

4. The method as claimed in claim 1, wherein the aforesaid polysulfone filtering membrane has a molecular weight cut-off of 30 kD.

5. The method as claimed in claim 1, wherein the aforesaid chromatographic process is salt in, salt out, gel filtration, ion exchange chromatography or affinity chromatography.

6. The method as claimed in claim 1, wherein the aforesaid milk is whole milk, defatted milk or whey.

* * * * *